United States Patent [19]

Katto et al.

[11] 4,431,772

[45] Feb. 14, 1984

[54] VINYL CHLORIDE RESIN COMPOSITION

[75] Inventors: Takayuki Katto; Masanori Oota; Katsumi Suzuki; Yoshikatsu Satake, all of Iwaki, Japan

[73] Assignee: Kureha Kagaku Kogyo Kabushiki Kaisha, Tokyo, Japan

[21] Appl. No.: 389,159

[22] Filed: Jun. 16, 1982

[30] Foreign Application Priority Data

Jun. 23, 1981 [JP] Japan .................................. 56-96862

[51] Int. Cl.$^3$ ...................... C08L 27/06; C08L 33/12; C08L 51/04
[52] U.S. Cl. ...................................... 525/80; 525/78; 525/81; 525/82; 525/84
[58] Field of Search ....................... 525/80, 84, 81, 82, 525/78

[56] References Cited

U.S. PATENT DOCUMENTS 4,166,082   8/1979   Hisazumi et al. ..................... 525/84

Primary Examiner—J. Ziegler
Attorney, Agent, or Firm—Wenderoth, Lind & Ponack

[57] ABSTRACT

A latex of a highly crosslinked butadiene rubber polymer comprising not less than 50% of butadiene, 1.0 to 10% of a crosslinking agent and a remainder of an ethylenically unsaturated monomer copolymerizable with butadiene, and having a particle size of 600 to 3,000 Å and a degree of swelling of not greater than 7 is obtained by one or more stages of emulsion polymerization. By polymerizing 15 to 30 parts of a monomer mixture of an alkyl methacrylate, an aromatic vinyl monomer, and optionally a crosslinking agent and an unsaturated nitrile in the presence of 85 to 70 parts of the rubber polymer, a graft copolymer is obtained. A composition comprising 2 to 40% of this graft copolymer and 98 to 60% of a vinyl chloride resin possesses high impact resistance coupled with improved stress-whitening resistance, which properties cannot be easily obtained at the same time in conventional resin compositions.

18 Claims, No Drawings

VINYL CHLORIDE RESIN COMPOSITION

TECHNICAL FIELD

The present invention relates generally to vinyl chloride resin compositions, and more particularly to a vinyl chloride resin composition which possesses improved impact resistance and can also provide resin products less liable to be stress-whitened upon deformation due, for example, to bending.

BACKGROUND OF THE INVENTION

It has hitherto been known in the art that the impact resistance of vinyl chloride resin products can be improved in each instance by blending withe the polyvinyl chloride resin a graft copolymer obtained by polymerizing one or more vinyl monomers such as styrene, acrylonitrile and methyl methacrylate in the presence of a rubbery material. The vinyl chloride resin composition thus obtained has fairly satisfactory transparency and impact resistance, but a formed product of the resin composition, when bent or folded, is liable to be stress-whitened around the portion at which the product is bent or folded. Especially, a formed resin product possessing high impact resistance tends to be stress-whitened notably whereby the commercial value of the product is impaired.

In general, it is difficult to obtain satisfactory impact resistance and stress-whitening resistance or anti-stress-whitening property at the same time. There has been an attempt to improve both these properties by suitably coagulating a rubber latex and graft-polymerising thereonto styrene, methyl methacrylate or the like as is disclosed in Japanese Patent Pub. No. 31462/1971 and Japanese Patent Pub. No. 1584/1979, but the suitable coagulation of the latex requires a high level of technology, and thus a simple method has been desired.

It has been known, on the other hand, that the stress-whitening resistance of vinyl chloride resin compositions can be improved by adding to the polyvinyl chloride (PVC) resin a graft copolymer comprising a relatively hard rubber component such as a highly crosslinked butadiene rubber having a low degree of swelling. However, the impact resistance tends to be lowered as the degree of crosslinkage increases, so that it has been difficult to attain both high impact resistance and improved stress-whitening resistance at the same time.

SUMMARY OF THE INVENTION

A principal object of the present invention is to provide a vinyl chloride resin composition which has high impact resistance and can also provide resin products not liable to be stress-whitened even upon bending.

We have investigated a method in which a highly crosslinked butadiene rubber is used as a trunk polymer, and found that high impact resistance coupled with satisfactory stress-whitening resistance can be obtained by using a densely crosslinked butadiene rubber having an average particle size of 600 to 3,000 Å and a relatively narrow range of particle size distribution, and further by using a graft copolymer comprising the rubber component in a ratio exceedingly higher than in conventional graft copolymers. On the basis of this finding, we have arrived at the present invention.

The vinyl chloride resin composition according to the present invention comprises (A) 60 to 98% (by weight, as in all percentages and parts set forth hereinafter) of a vinyl chloride resin and (B) 2 to 40% of a graft copolymer, which graft copolymer has been obtained by adding and polymerizing, in one or more stages, 15 to 30 parts of a monomer mixture of an alkyl methacrylate, an aromatic vinyl monomer, and optionally an unsaturated nitride containing a crosslinking agent in a quantity of 0 to 10% based on the monomer mixture including the crosslinking agent in the presence of a latex comprising 70 to 85 parts of a crosslinked rubber polymer having a degree of swelling of not greater than 7 and a particle size of 600 to 3000 Å, the sum of the quantities of the monomer mixture and the rubber polymer amounting to 100 parts, the latex of the rubber polymer in turn having been obtained through one or more stages of emulsion polymerization of a mixture monomer, the mixture monomer used in each stage comprising not less than 50% of butadiene, 0.2 to 20% of a crosslinking agent and a remainder of an ethylenically unsaturated monomer copolymerizable with butadiene, the rubber polymer thus having a total content of the crosslinking agent of 1.0 to 10%.

Most of the graft copolymers heretofore used as impact resistance modifiers contained not more than 70% of a rubber component. One of the reasons for this was that a graft copolymer containing 70% or more of a rubber component was liable to agglomerate when subjected to acid precipitation (or salting out) or drying of the precipitated graft copolymer latex. The graft copolymer of this invention does not agglomerate even when subjected to acid precipitation (or salting out) or drying and thus can readily provide a dry powder, notwithstanding the fact that the content of the rubber component is as high as 70 to 85%, because the rubber component is densely crosslinked.

DETAILED DESCRIPTION OF THE INVENTION

The vinyl chloride resin composition of the present invention will now be described in detail in line with the process for preparation thereof.

First, the densely crosslinked rubber polymer latex is prepared by emulsion polymerization. This rubber polymer latex can be obtained through single- or multistage emulsion polymerization of a monomer mixture comprising not less than 50%, preferably not less than 60%, of butadiene, 0.2 to 20% of a crosslinking agent and a remainder, preferably 5 to 40%, of an ethylenically unsaturated monomer copolymerizable with butadiene. The polymer latex can be easily obtained by conventional emulsion polymerization in the presence of a suitable emulsifier and initiator.

For the ethylenically unsaturated monomer copolyerizable with butadiene, aromatic vinyl monomers, alkyl methacrylates and alkyl acrylates can be used.

For the aromatic vinyl monomer, styrene is most preferred, but α-methyl styrene, vinyl naphthalene, alkyl-substituted styrene such as 3,4-dimethylstyrene and vinyltoluene, or halosubstituted styrene such as p-bromostyrene and p-chlorostyrene can also be used.

For the alkyl methacrylate, those having 1 to 4 carbon atoms in the alkyl group are preferred among which methyl methacrylate, ethyl methacrylate, n-butyl methacrylate and isobutyl methacrylate are generally employed.

For the alkyl acrylate, those having 1 to 8 carbon atoms in the alkyl group, for example, methyl acrylate, ethyl acrylate, butyl acrylate and 2-ethyl hexyl acrylate, are preferable.

In order to obtain an end product composition of the graft copolymer and a vinyl chloride resin with improved stress-whitening resistance coupled with high impact resistance, it is essential that the butadiene rubber polymer be densely crosslinked and have a degree of swelling of not greater than 7, preferably 2 to 6.

The degree of swelling was determined as follows.

A given quantity of a butadiene rubber polymer sample was dipped into toluene and left standing for 24 hours at 20° C. Thereafter, the polymer sample was filtered through a 400-mesh wire gauze, and the degree of swelling was determined as $$\frac{W_1}{W_2} - 1,$$

wherein $W_1$ was the weight of the polymer sample including toluene and $W_2$ was the weight of the dried polymer sample.

If the degree of swelling exceeds 7, the rubber polymer will become too soft, resulting in poor stress-whitening resistance, and the graft copolymer, when subjected to coagulation or drying, tends to agglomerate.

In order to form a relatively hard rubber polymer having a degree of swelling of not greater than 7, the total content of the crosslinking agent must be 1.0 to 10%, preferably 1 to 5%, of the rubber polymer so that the density of cross linkage will be sufficiently high. In the case where the content of the crosslinking agent is less than 1.0%, a densely crosslinked rubber polymer having a degree of swelling of not greater than 7 is difficult to obtain. When this content is above 10%, the rubber polymer becomes excessively hard, and the impact resistance imparting effect thereof will be drastically lowered.

The crosslinking agents which can be used herein are selected from those copolymerizable with butadiene and ethylenically unsaturated monomers such as divinylbenzene, ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, trimethylolpropane trimethacrylate or triacrylate, and 1,3-butylene dimethacrylate.

The particle size of the butadiene rubber polymer latex must be 600 to 3,000 Å. A polymer latex having a smaller particle size shows poor impact resistance imparting effect, while the use of a latex having a particle size larger than 3,000 Å is undesirable from the viewpoint of the stress-whitening resistance of PVC compositions. A latex having a particle size in the specified range can be obtained by single-step polymerization in the presence of a suitable emulsifier and catalyst. It may be desirable, however, that a latex having a relatively large particle size, for example, above about 1,500 Å, be prepared by two or more stages of seed polymerization to obtain an increased particle size in view of the controllability and uniformity of the particle size.

The term "multi-stage seed polymerization" as used herein refers to a series of polymerization steps which involve polymerizing an additional monomer mixture in the presence of a polymer formed in the preceding stage by polymerizing a part of the monomer mixture.

As another method of producing rubbers of a large particle size, microscopic coagulation of rubber particles of a small size with an acid or salt is known in the art. Ordinarily, however, the rubber obtained by this method has a wide particle size distribution and often comprises rubber particles of a notably large particle size whereby the stress-whitening resistance of a composition of the graft copolymer and a polyvinyl chloride resin is sometimes impaired.

A rubber of a large particle size obtained by multi-stage seed polymerization, on the other hand, has the characteristic feature of a narrow particle size distribution and thus can impart to a graft copolymer/vinyl chloride resin composition higher stress-whitening resistance than a rubber obtained by the microscopic coagulation method.

In order to prepare the butadiene rubber polymer by single-stage emulsion polymerization, 1.0 to 10% of a crosslinking agent is used in the polymerization.

In the case where emulsion polymerization is conducted in two or more stages, a mixture monomer comprising not less than 60% of butadiene, 0.2 to 20% of a crosslinking agent and a remainder of an ethylenically unsaturated monomer copolymerizable with butadiene is polymerized in each stage so that the end product rubber polymer will have a total content of the crosslinking agent of 1.0 to 10%. Even if the total content of the crosslinking agent ranges from 1.0 to 10% of the end product rubber polymer obtained by two or more stages of polymerization, satisfactory stress-whitening resistance and impact resistance cannot be achieved at the same time when the quantity of the crosslinking agent used in any one of the stages is outside of the range of from 0.2 to 20%.

In multi-stage polymerization a variety of combinations may be possible as long as the crosslinking agent is added in each stage in a quantity of from 0.2 to 20% and the end product rubber polymer has a total content of the crosslinking agent of 1.0 to 10%. For example, the rubber polymer may be densely crosslinked in the first stage and less densely in the second stage or vice versa, or equally crosslinked in the first and second stages.

The graft copolymer is prepared by polymerizing in one or more stages 15 to 30 parts of a monomer mixture of an alkyl methacrylate and an aromatic vinyl monomer, or an alkyl methacrylate, an aromatic vinyl monomer and an unsaturated nitrile in the presence of a latex comprising 70 to 85 parts of the above described densely crosslinked butadiene rubber polymer having a particle size of 600 to 3,000 Å, a total content of the crosslinking agent of 1.0 to 10% and a degree of swelling of not greater than 7. In this case, emulsion polymerization is again conducted in the presence of an initiator or the like, if necessary. The aromatic vinyl monomer and alkyl methacrylate used for the preparation of this graft copolymer are the same as those employed for the formation of the rubber polymer, a preferred aromatic vinyl monomer being styrene and a preferred alkyl methacrylate being methyl methacrylate.

In the polymerization of the grafting component, a crosslinking agent which can effectively promote uniform dispersion of the graft copolymer in the vinyl chloride resin when melt-mixed therewith is used in a quantity of not exceeding 10%, preferably from 0.01 to 8%. In the case where more than 10% of the crosslinking agent is used, the effect of imparting impact resistance to the resin composition becomes poor. In this stage where a mixture of an alkyl methacrylate and an aromatic vinyl monomer is used, a small quantity of an unsaturated nitrile may be added to enhance the compatibility of the graft copolymer with the vinyl chloride resin. For the unsaturated nitrile, acrylonitrile and methacrylonitrile can be used.

This polymerization of the grafting component provides polymer particles in which the rubber layer is for the most part or completely covered with a hard polymer. In the polymerization of the grafting component, 15 to 30 parts of the monomer mixture mentioned previously may be added and polymerized either at one time or at several different times in divided lots.

It is preferable that the ratio between the alkyl methacrylate and the aromatic vinyl monomer be 10 to 90% to 90 to 10%. In the case where an unsaturated nitrile is used, it is used in a quantity of 50% or less, preferablty 40% or less. When the monomer mixture is polymerized stepwise in divided lots, improved stress-whitening resistance and impact resistance can be obtained if the last monomer charge has a high content of the alkyl methacrylate. It is most desirable from the viewpoint of the compatibility with the vinyl chloride resin to polymerize 15 to 30 parts of the monomer mixture to be grafted onto the rubber trunk polymer in two divided lots, first polymerizing 50 to 90% based on the total grafting component of a monomer mixture comprising 0 to 10% of the crosslinking agent, 10 to 90% of the alkyl methacrylate and 90 to 10% of the aromatic vinyl monomer and then polymerizing 50 to 10% of a monomer comprising the alkyl methacrylate and the crosslinking agent.

It is of course possible to add to each of the lots a small quantity of an unsaturated nitrile.

In accordance with the present invention, a resin composition with improved transparency can be obtained by selecting and controlling to a slight extent the species and proportions of the monomer constituting the rubber component and grafting component so that the refractive index of the graft copolymer will be close to that of the vinyl chloride resin to be blended therewith.

The quantity of the monomer mixture used for the polymerization of the grafting component is 15 to 30 parts for 70 to 85 parts of the crosslinked rubber polymer, preferably 15 to 27.5 parts for 72.5 to 85 parts of the same polymer, thus producing 100 parts of a graft copolymer. If the quantity of the cross-linked rubber polymer is less than 70%, the graft copolymer obtained will have a poor impact resistance imparting effect, and the PVC composition will have low stress-whitening resistance. If this quantity is above 85 parts, the graft copolymer will be liable to agglomerate when the latex is subjected to salting out, acid precipitation or drying.

Since the polymerization yield of the graft copolymer in each stage is extremely high in the present invention, the proportions of the monomers can be regarded as substantially equal to the proportions of the components of the polymers.

For the vinyl chloride resin to be blended with the impact modifier copolymer obtained in the manner described above, polyvinyl chloride, a copolymer of 70% or more vinyl chloride and a monomer copolymerizable therewith, or a mixture thereof can be used. Examples of monomers copolymerizable with the vinyl chloride are vinyl acetate, vinylidene chloride, acrylic acid, ethyl acrylate, ethylene, propylene and isobutylene. The vinyl chloride resins can be those obtained by conventional methods such as suspension polymerization and emulsion polymerization.

With 60 to 98% of the vinyl chloride resin, 2 to 40% of the impact modifier copolymer is blended. If the quantity of the impact modifier copolymer is less than 2%, the desired impact strength imparting effect cannot be obtained, while in case this polymer is added in a quantity exceeding 40%, the innate properties of the vinyl chloride resin will be lost.

Blending can be carried out by a conventional method, for example, in a roll mill or a Banbury mixer. A method which involves blending the impact modifier copolymer latex with a vinyl chloride resin latex, and subjecting the polymer blend to salting out or acid precipitation can also be utilized.

If desired, heat stabilizers, antioxidants, lubricants and the like additives may be added to the resin composition of the present invention.

In order to indicate more fully the nature and utility of this invention, the following specific examples of practice constituting preferred embodiments of the invention and comparison examples are set forth, it being understood that these examples are presented as illustrative only and not intended to limit the scope of the invention.

The particle size of the latex was measured in accordance with the turbidimetric method.

EXAMPLES 1 THROUGH 4

220 parts of water, 0.0022 part of $FeSO_4.7H_2O$ (activator), 0.0037 part of sodium salt of ethylenediaminetetraacetic acid (hereinafter abbreviated to Na salt of EDTA) (chelating agent), 0.12 part of sodium pyrophosphate (latex viscosity controlling agent), 0.056 part of Rongalit, 0.133 part of potassium oleate (abbrev. OLK, emulsifier), 4.4 parts of styrene (abbrev. St), 17.8 parts of butadiene (abbrev. Bu), 0.11 part (Example 1) or 1.1 parts (Example 2) of divinylbenzene (abbrev. DVB), and 0.078 part of diisopropylbenzene hydroperoxide (abbrev. HPO) were charged into a polymerization vessel. The mixture was subjected to polymerization at 60° C. for 16 hours.

To the latex obtained were added 0.87 part of OLK, 43.2 parts of Bu, 12.3 parts of St, 0.83 part of DVB, 10 parts of water, 0.078 part of Rongalit, and 0.15 part of HPO, and the reaction mixture was subjected to polymerization at 45° C. for 20 hours. As a result, a two-stage-polymerized rubber latex was obtained. The particle sizes of the latexes were 1,550 Å (Example 1) and 1,600 Å (Example 2) as measured at this stage.

To each of the latexes obtained were added 5.6 parts of methyl methacrylate (abbrev. MMA), 11.1 parts of St, 0.081 part of DVB, 0.056 part of HPO, 0.056 part of Rongalit, and 10 parts of water, and polymerization was conducted at 60° C. for 5 hours. To each of the resulting latexes was further added 5.6 parts of MMA together with 0.028 part each of DVB, HPO and Rongalit, and polymerization was continued at 60° C. for another 5 hours.

To the latexes thus obtained was added a phenolic antioxidant, and the latexes were precipitated with hydrochloric acid, filtered and dried. As a result, MMA-Bu-St graft copolymers (abbrev. MBS) were obtained in yields of 97.5% (Example 1) and 98.5% (Example 2).

Separately, two types of MBS graft copolymers were prepared by the procedure described above except that 8.9 parts of St, 13.3 parts of Bu and 0.11 part (Example 3) or 1.1 part (Example 4) of DVB were used in the first-stage polymerization, and that 8.3 parts of MMA and 8.3 parts of St were used in the third-stage polymerization. The particle sizes of the rubber latexes obtained in the second-stage polymerization were 1,540 Å (Example 3) and 1,600 Å (Example 4), and the yields were 98% and 98.5% after the fourth-stage polymerization.

These graft copolymers were found to have a rubber component: grafting component ratio of 77.7:22.3.

COMPARISON EXAMPLES 1, 2 AND 3

The procedure of Examples 1 and 2 was repeated except that the quantities of DVB used in the first and second stages were varied, whereupon the MBS graft copolymers shown in Table 1 as Comparison Examples 1, 2 and 3 were obtained in yields of 97.5 to 99%.

Comparison Example 1 was prepared by adding no DVB at any state; Comparison Example 2 by adding no DVB in the first stage but 0.83 part of DVB in the second stage; and Comparison Example 3 by adding 1.1 parts of DVB in the first stage but no DVB in the second stage.

The percentage of DVB used in the first and second stages in the preparation of Examples 1 through 4 and Comparison Examples 1, 2 and 3; the degree of swelling of the first-stage rubber polymer; and the particle size of the rubber latex, the percentage of DVB and the degree of swelling of the total rubber polymer (the two-stage polymerized rubber polymer) are set forth in Table 1.

The impact resistance, transparency and stress-whitening resistance of the polymer sheet specimens thus prepared are shown in Table 2 below.

TABLE 2

|  | MBS/PVC | Degree of stress whitening | | Izod impact strength (Kg · cm/cm) | | Transparency | |
|---|---|---|---|---|---|---|---|
|  |  |  |  | 23° C. | 0° C. |  |  |
| MBS |  | Bending | Ball drop | V-notch | U-notch | Tp (%) | H (%) |
| Example 1 | 10/90 | slight | slight | 74 | 64 | 81.7 | 5.1 |
| Example 2 | " | extremely slight | extremely slight | 108 | 99 | 81.0 | 5.7 |
| Example 3 | " | slight | slight | 62 | 45 | 84.3 | 3.9 |
| Example 4 | " | extremely slight | extremely slight | 85 | 66 | 86.6 | 2.7 |
| Comparison Example 1 | " | extremely pronounced | extremely pronounced | 61 | 52 | 78.5 | 6.8 |
| Comparison Example 2 | " | pronounced | pronounced | 50 | 51 | 80.3 | 5.2 |
| Comparison Example 3 | " | extremely pronounced | extremely pronounced | 59 | 67 | 78.5 | 7.2 |

Note:
V-notch: R = 0.25 mm
U-notch: R = 1.0 mm

The Izod impact strength was measured at 23.5° C. in accordance with JIS K-7110, using polymer sheet specimens of 6 mm thickness with V-notches. The parallel ray transmittance (Tp) and haze (H) of the polymer sheet of 1 mm thickness were measured by means of a hazeometer, Model TC-HIII with C-filter manufactured by Tokyo Denshoku K.K., Japan.

Separately, the polymer sheets were cut to a size of 1 mm thickness, 20 mm width and 50 mm length, and the bending-whitening property of each sheet so cut was tested at room temperature at a bending rate of 150 rpm and a bending angle of 130°. A ball-drop whitening test was also conducted by dropping a stainless-steel cylinder with a hemisphere of a diameter of 1 cm at the end portion having a weight of 500 g from a height of 50 cm onto a polymer sheet specimen of 1 mm thickness.

EXAMPLES 5 THROUGH 8 AND COMPARISON EXAMPLE 4

46.8 parts of Bu, 18.2 parts of St, varying quantities (as shown in Table 3) of DVB, 0.059 part of HPO, 0.3

TABLE 1

|  | First-stage DVB | | Degree of swelling of first-stage rubber polymer | Second-stage DVB | | Rubber polymer | | |
|---|---|---|---|---|---|---|---|---|
|  |  |  |  |  |  | Particle size of latex (Å) | DVB (%) | Degree of swelling |
|  | Part | % |  | Part | % |  |  |  |
| Example 1 | 0.11 | 0.49 | 6.5 | 0.83 | 1.5 | 1550 | 1.2 | 4.7 |
| Example 2 | 1.1 | 4.7 | 3.2 | 0.83 | 1.5 | 1600 | 2.4 | 4.0 |
| Example 3 | 0.11 | 0.49 | 7.2 | 0.83 | 1.5 | 1540 | 1.2 | 4.6 |
| Example 4 | 1.1 | 4.7 | 4.8 | 0.83 | 1.5 | 1600 | 2.4 | 4.0 |
| Comparison Example 1 | 0 | 0 | 11 | 0 | 0 | 1550 | 0 | 12.0 |
| Example 2 | 0 | 0 | 13 | 0.83 | 1.5 | 1550 | 1.0 | 5.2 |
| Example 3 | 1.1 | 4.7 | 3.3 | 0 | 0 | 1600 | 1.3 | 11.0 |

Subsequently, 10% each of the MBS's obtained in the manner described above and 90% of polyvinyl chloride (abbrev. PVC) of an average polymerization degree of 700 containing 2% of octyltin mercaptate (stabilizer) were kneaded with rolls at 180° C. for 4 min. and press-formed at 200° C. to prepare sheets of 6 mm thickness (for Izod impact strength tests) and 1 mm thickness (for transparency and stress-whitening tests).

part of OLK, 0.0033 part of Na salt of EDTA, 0.002 part of FeSO$_4$.7H$_2$O, 0.109 part of sodium pyrophosphate, 0.029 part of Rongalit, and 150 parts of water were charged into a polymerization vessel. The mixture was subjected to polymerization at 50° C. for 6 hours, and then at 60° C. for 10 hours. The yield was about 99% in all cases.

22.5 parts (as a solids content) of each latex obtained was charged into the vessel to which were added 42.3 parts of Bu, 12.7 parts of St, 0.83 part of DVB, 0.0495 part of HPO, 0.8 part of OLK, 0.0028 part of Na salt of EDTA, 0.0017 part of FeSO$_4$.7H$_2$O, 0.092 part of sodium pyrophosphate, 0.0246 part of Rongalit, and 183 parts of water, and polymerization was conducted at 60° C. for 20 hours to obtain a two-stage-polymerized rubber latex. The degree of swelling of each of the rubber polymers obtained at this stage was not greater than 7.

To each latex were added 5 parts of St, 10 parts of MMA, 0.075 part of DVB, 0.011 part of HPO, 0.017 part of Rongalit, and 2 parts of water, and polymerization was conducted at 60° C. for 3 hours. To the resulting latex were further added 5 parts of MMA, 0.025 part of DVB, 0.005 part of HPO, 0.005 part of Rongalit, and 2 parts of water, and polymerization was continued at 60° C. for 5 hours.

Each of the polymers thus obtained was subjected to a post-treatment under the same conditions as in Example 1 to obtain an MBS graft copolymer in a yield of 99% or higher.

This graft copolymer was found to have a rubber component:grafting component ratio of 80:20.

The proportion of DVB used in the first stage, the degree of swelling of the first-stage rubber polymer and the particle size of the two-stage-polymerized rubber latex are shown in Table 3.

TABLE 3

|  | First-stage DVB | | Degree of swelling of first-stage rubber polymer | Second-stage DVB | | Rubber polymer | | |
| --- | --- | --- | --- | --- | --- | --- | --- | --- |
|  | Part | % |  | Part | % | Particle size of latex (Å) | DVB (%) | Degree of swelling |
| Example 5 | 0.98 | 1.5 | 5.5 | 0.83 | 1.5 | 1810 | 1.5 | 5.1 |
| Example 6 | 2.0 | 2.9 | 4.5 | 0.83 | 1.5 | 1710 | 1.9 | 4.7 |
| Example 7 | 3.3 | 4.8 | 3.9 | 0.83 | 1.5 | 1830 | 2.5 | 4.3 |
| Example 8 | 6.5 | 9.1 | 3.4 | 0.83 | 1.5 | 1780 | 3.7 | 4.1 |
| Comparison Example 4 | 0 | 0 | 12 | 0.83 | 1.5 | 1730 | 1.1 | 5.6 |

Similarly as in Example 1, 12.5% each of the four-stage-polymerized MBS graft copolymers obtained in the manner described above and 87.5% of PVC were kneaded with rolls at 160° C. for 4 min. and press-formed at 200° C. to prepare sheets of 6 mm thickness and 1 mm thickness.

The Izod impact strength, stress-whitening resistance and transparency of each of the polymer sheets thus formed were as summarized in Table 4.

TABLE 4

| MBS | MBS/ PVC | Degree of stress Whitening Ball drop | Izod impact strength (Kg · cm/cm) 23° C., V-notch | Transparency Tp (%) | H (%) |
| --- | --- | --- | --- | --- | --- |
| Example | | | | | |
| 5 | 12.5/87.5 | extremely slight | 83 | 84.1 | 4.0 |
| 6 | " | extremely slight | 76 | 86.3 | 2.7 |
| 7 | " | extremely slight | 99 | 86.0 | 2.7 |
| 8 | " | extremely slight | 91 | 87.8 | 2.1 |
| Comparison Example 4 | " | pronounced | 72 | 84.5 | 3.4 |

EXAMPLE 9

220 parts of water, 0.0022 part of FeSO$_4$.7H$_2$O, 0.0037 part of Na salt of EDTA, 0.121 part of sodium pyrophosphate, 0.056 part of Rongalit, 0.167 part of OLK, 6.7 parts of St, 15.6 parts of Bu, 3.3 parts (12.8%) of DVB, and 0.078 part of HPO were charged into a polymerization vessel and subjected to polymerization at 60° C. for 16 hours.

To the latex thus obtained were added 0.833 part of OLK, 43.2 parts of Bu, 12.3 parts of St, 0.83 part (1.5%) of DVB, 10 parts of water, 0.078 part of Rongalit, and 0.15 part of HPO, and polymerization was carried out at 45° C. for 20 hours. The particle size of the two-stage-polymerized rubber latex obtained was 1,350 Å. The degree of swelling of the first-stage rubber polymer was 5.6, and that of the total rubber polymer was 3.4. The proportion of DVB was 5.0% of the rubber polymer.

To the latex were added 11.1 parts of MMA, 5.6 parts of St, 0.081 part of DVB, 5 parts of water, 0.056 part of Rongalit, and 0.056 part of HPO, and polymerization was conducted at 60° C. for 5 hours.

To this latex were further added 5.6 parts of MMA, 0.028 part each of DVB, HPO and Rongalit, and 5 parts of water, and polymerization was continued at 60° C. for another 5 hours.

The polymer obtained was subjected to a post-treatment under the same conditions as in the preceding Examples to obtain a four-stage-polymerized MBS graft copolymer in a yield of 98.5%. This copolymer had a rubber component: grafting component ratio of 77.7:22.3.

EXAMPLE 10

220 parts of water, 0.0022 part of FeSO$_4$.7H$_2$O, 0.0037 part of Na salt of EDTA, 0.121 part of sodium pyrophosphate, 0.056 part of Rongalit, 0.167 part of OLK, 8.3 parts of St, 13.9 parts of Bu, 3.3 parts (13.0%) of ethyleneglycol dimethacrylate, and 0.078 part of HPO were charged into a polymerization vessel and subjected to polymerization at 60° C. for 16 hours.

To the latex obtained were added 0.833 part of OLK, 43.2 parts of Bu, 12.3 parts of St, 0.83 part (1.5%) of DVB, 10 parts of water, 0.078 part of Rongalit, and 0.15 part of HPO, and polymerization was resumed at 45° C. for 18 hours. The particle size of this two-stage-polymerized rubber latex was 1,420 Å. The degree of swelling of the first-stage rubber polymer was 4.7, and that of the total rubber polymer obtained after the second-stage polymerization was 3.9. The proportion of the crosslinking agent was 5.0% of the total rubber polymer.

To this latex was then added 7.8 parts of MMA, 3.3 parts of acrylonitrile, 5.6 parts of St, 0.081 part of DVB, 5 parts of water, 0.056 part of Rongalit, and 0.056 part of HPO, and polymerization was continued at 60° C. for 7 hours.

To the resulting latex were added 5.6 parts of MMA, and 0.028 part each of DVB, HPO and Rongalit, and polymerization was further conducted at 60° C. for 5 hours.

The polymer thus obtained was subjected to a post-treatment similarly as in the preceding Examples to obtain a four-stage-polymerized graft copolymer in a yield of 98%. The rubber component: grafting component ratio of this copolymer was 77.7:22.3.

EXAMPLE 11

220 parts of water, 0.0022 part of $FeSO_4.7H_2O$, 0.0037 part of Na salt of EDTA, 0.121 part of sodium pyrophosphate, 0.056 part of Rongalit, 0.167 part of OLK, 8.3 parts of St, 13.9 parts of Bu, 4.4 parts (16.5%) of ethyleneglycol dimethacrylate, and 0.078 part of HPO were charged into a polymerization vessel and subjected to polymerization at 60° C. for 16 hours.

To the latex thus obtained were added 0.833 part of OLK, 43.2 parts of Bu, 12.3 parts of St, 0.83 part (1.5%) of DVB, 10 parts of water, 0.078 part of Rongalit, and 0.15 part of HPO, and polymerization was carried out at 45° C. for 18 hours. The particle size of the rubber latex obtained at this stage was 1,390 Å. The degree of swelling of the first-stage rubber polymer was 5.0, and that of the total rubber polymer was 3.9. The content of the crosslinking agent in the total rubber polymer was 6.3%.

To the latex were further added 16.7 parts of MMA, 5.6 parts of St, 0.11 part of DVB, 10 parts of water, 0.084 part of Rongalit, and 0.084 part of HPO, and polymerization was continued at 60° C. for 7 hours.

The polymer obtained was subjected to a post-treatment similarly as in the preceding Examples to obtain a three-stage-polymerized graft copolymer in a yield of 99%. The rubber component:grafting component ratio of this copolymer was 77.7:22.3.

Properties of the polymers of Examples 9, 10 and 11

12.5% each of the graft copolymers obtained in Examples 9, 10 and 11 and 87.5% of PVC were kneaded with rolls at 160° C. for 4 min. and press-formed at 200° C. to prepare sheets of 6 mm thickness and 1 mm thickness as in the preceding Examples.

The Izod impact strength, stress-whitening resistance and transparency of the polymer sheets thus formed were as set forth in Table 5.

TABLE 5

| MBS | MBS/PVC | Degree of stress whitening Ball drop | Izod impact strength (Kg · cm/cm) 23° C., V-notch | Transparency Tp (%) | H (%) |
|---|---|---|---|---|---|
| Example |  |  |  |  |  |
| 9 | 12.5/87.5 | extremely slight | 65 | 88.8 | 1.8 |
| 10 | " | extremely slight | 88 | 87.4 | 2.3 |
| 11 | " | extremely slight | 74 | 88.2 | 1.6 |

EXAMPLE 12

678 parts of water, 0.00696 part of $FeSO_4.7H_2O$, 0.0115 part of Na salt of EDTA, 0.379 part of sodium pyrophosphate, 0.0289 part of Rongalit, 0.348 part of OLK, 18.4 part of St, 61.6 parts of Bu, 1.2 parts (1.5%) of DVB, and 0.072 part of HPO were charged into a polymerization vessel and subjected to polymerization at 50° C. for 16 hours.

To the latex obtained were added 0.0288 part of HPO, 0.0154 part of Rongalit, and 2 parts of water, and polymerization was conducted at 50° C. for 18 hours. The rubber latex thus produced had a particle size of 1,530 Å.

To this latex were then added 0.522 part of OLK, 6.96 parts of MMA, 8 parts of St, 0.075 part of DVB, 0.0113 part of HPO, 0.0113 part of Rongalit, and 10 parts of water, and polymerization was carried out at 50° C. for 5 hours.

To the resulting latex were further added 5.04 parts of MMA, 0.0252 part of DVB, 0.00252 part of HPO, 0.00252 part of Rongalit, and 10 parts of water, and polymerization was continued at 50° C. for another 5 hours.

The polymer obtained was subjected to a post-treatment under the same conditions as in the preceding Examples to obtain an MBS graft copolymer in a yield of 98%. The rubber component:grafting component ratio of this copolymer was 80:20.

COMPARISON EXAMPLE 5

An MBS graft copolymer was obtained in a yield of 99% by the procedure of Example 12 except that the quantity of DVB used for the rubber polymerization was 0.08 part (0.1%).

The particle size of the rubber latex obtained after the rubber polymerization was 1,450 Å.

The degrees of swelling of the rubber polymers of Example 12 and Comparison Example 5 prior to the graft polymerization were 3.7 and 8.0 respectively.

10% each of the MBS graft copolymers and 90% of PVC were kneaded with rolls at 180° C. for 4 min. and press-formed at 200° C. to prepare sheets of 6 mm thickness and 1 mm thickness as in the preceding Examples.

The Izod impact strength, stress-whitening resistance and transparency of the polymer sheets thus formed were as shown in Table 6.

TABLE 6

| MBS | MBS/PVC | Degree of stress whitening Ball drop | Izod impact strength (Kg · cm/cm) 23° C., V-notch | Transparency Tp (%) | H (%) |
|---|---|---|---|---|---|
| Example 12 | 10/90 | extremely slight | 39 | 86.5 | 2.7 |
| Comparison Example 5 | 10/90 | extremely pronounced | 9 | 84.2 | 3.6 |

EXAMPLES 13 AND 14

49 parts of Bu, 16 parts of St, 1.3 parts (2.0%) of DVB, 0.117 part of HPO, 0.109 part of sodium pyrophosphate, 0.0033 part of Na salt of EDTA, 0.002 part of $FeSO_4.7H_2O$, 0.0234 part of Rongalit, 0.21 part of OLK, and 150 parts of water were charged into a polymerization vessel and subjected to polymerization at 50° C. for 6 hours and then at 60° C. for 10 hours. Thus, a rubber latex having a particle size of 1,100 Å was obtained in a yield of 99%.

To this latex as a seed were added 254 parts of Bu, 99 parts of St, 6.7 parts (1.9%) of DVB, 0.607 part of HPO, 0.566 part of sodium pyrophosphate, 0.017 part of Na salt of EDTA, 0.010 part of FeSO$_4$.7H$_2$O, 0.121 part of Rongalit, 4.6 parts of OLK, and 779 parts of water, and polymerization was carried out at 60° C. for 20 hours. At this stage, a rubber latex having a particle size of 2,050 Å was obtained in a yield of 99%. The degree of swelling of the rubber polymer was 5.0, and the total content of the crosslinking agent in this polymer was 1.9%.

256 parts (78 parts as solid content) of the rubber latex and 22 parts of water were charged into a separate polymerization vessel to which were added 5.5 parts of St, 11 parts of MMA, 0.083 parts of DVB, 0.0125 part of HPO, and 0.0125 part of Rongalit. The mixture was subjected to polymerization at 60° C. for 3 hours.

To the latex obtained were added 5.5 parts of MMA, 0.028 part of DVB, 0.0055 part of HPO, and 0.0055 part of Rongalit, and polymerization was further conducted at 60° C. for 5 hours. The yield was not lower than 99% (Example 13).

Similarly, 246 parts (75 parts as solid content) of the rubber latex obtained in the manner described above and 30 parts of water were fed to a polymerization vessel to which were added 6.3 parts of St, 12.4 parts of MMA, 0.094 part of DVB, 0.014 part of HPO, and 0.014 part of Rongalit. The mixture was subjected to polymerization at 60° C. for 5 hours, whereupon an MBS graft copolymer having a rubber component:grafting component ratio of 75:25 was obtained in a yield of not lower than 99% (Example 14).

COMPARISON EXAMPLE 6

213 parts (65 parts as solid content) of the rubber latex of Example 13 and 52 parts of water were charged into a polymerization vessel to which were added 8.7 parts of St, 17.6 parts of MMA, 0.13 part of DVB, 0.02 part of HPO, and 0.02 part of Rongalit, and the resulting mixture was subjected to polymerization at 60° C. for 9 hours.

To the latex obtained were added 8.8 parts of MMA, 0.044 part of DVB, 0.0088 part of HPO, and 0.0088 part of Rongalit, and polymerization was conducted at 60° C. for 5 hours. As a result, an MBS graft copolymer having a rubber component:grafting component ratio of 65:35 was obtained in a yield of not lower than 99%.

EXAMPLE 15

98 parts of Bu, 32 parts of St, 3.1 parts (2.3%) of DVB, 0.234 part of HPO, 0.6 part of OLK, 0.0066 part of Na salt of EDTA, 0.004 part of FeSO$_4$.7H$_2$O, 0.218 part of sodium pyrophosphate, 0.058 part of Rongalit, and 300 parts of water were charged into a polymerization vessel, and subjected to polymerization at 50° C. for 6 hours and then at 60° C. for 10 hours. Thus, a latex having a particle size of 1,000 Å was obtained in a yield of approximately 99%.

To this latex as a seed were added 470 parts of Bu, 154 parts of St, 15 parts (2.3%) of DVB, 1.12 parts of HPO, 8.1 parts of OLK, 0.0317 part of Na salt of EDTA, 0.0192 part of FeSO$_4$.7H$_2$O, 1.05 parts of sodium pyrophosphate, 0.278 part of Rongalit, and 1,440 parts of water, and polymerization was carried out at 60° C. for 20 hours. In this manner was obtained in a yield of nearly 99% a latex having a particle size of 1,800 Å and a solid content of 30.6%. The rubber polymer thus obtained had a degree of swelling of 3.3 and a crosslinking agent content of 2.3%.

255 parts (78 parts as solid content) of this latex was fed to a separate polymerization vessel to which were added 5.5 parts of St, 11 parts of MMA, 0.083 part of DVB, 0.0125 part of HPO, 0.0125 part of Rongalit, and 23 parts of water. The mixture was subjected to polymerization.

To the latex thus obtained were further added 5.5 parts of MMA, 0.028 part of DVB, 0.0055 part of HPO, and 0.0055 part of Rongalit, and polymerization was continued at 60° C. for 5 hours. The yield was not lower than 99%.

The polymer was then subjected to a post-treatment similarly as in the preceding Examples to obtain an MBS graft copolymer powder having a rubber component:grafting component ratio of 78:22.

COMPARISON EXAMPLE 7

212 parts (65 parts as solid content) of the rubber polymer latex obtained in Example 15 and 53 parts of water were charged into a polymerization vessel to which were added 8.7 parts of St, 17.6 parts of MMA, 0.13 part of DVB, 0.02 part of HPO, and 0.02 part of Rongalit in the same order as in Example 15. The resulting mixture was subjected to polymerization at 60° C. for 3 hours.

To the latex obtained were added 8.8 parts of MMA, 0.044 part of DVB, 0.0088 part of HPO, and 0.0088 part of Rongalit, and polymerization was conducted at 60° C. for 5 hours. The yield was not lower than 99%, and an MBS graft copolymer having a rubber component:-grafting component ratio of 65:35 was obtained.

Each of the MBS graft copolymers obtained in Examples 13, 14 and 15 and Comparison Examples 6 and 7 and PVC were kneaded with rolls at 180° C. and press-formed at 200° C. to prepare sheets of 6 mm thickness and 1 mm thickness as in the preceding Examples, the quantity of the MBS graft copolymer being 12 or 14 parts per 100 parts of PVC.

The Izod impact strength, stress-whitening resistance and transparency of the polymer sheets thus formed were as summarized in Table 7.

TABLE 7

| MBS | MBS/PVC ratio (part) | Rubber component/ graft component ratio in MBS (weight ratio) | Izod impact strength (Kg · cm/cm) 23° C., V-notch | Transparency Tp (%) | H (%) | Degree of* stress whitening (Ball drop) |
|---|---|---|---|---|---|---|
| Example 13 | 12 | 78/22 | 39 | 86.4 | 2.5 | 1 |
|  | 14 |  | 89 |  |  |  |
| Example 14 | 12 | 75/25 | 31 | 86.3 | 2.5 | 2 |
|  | 14 |  | 68 |  |  |  |
| Comparison Example 6 | 12 | 65/35 | 12 | 86.3 | 2.4 | 3 |
|  | 14 |  | 56 |  |  |  |
| Example 15 | 12 | 78/22 | 53 | 87.3 | 2.0 | 1 |
|  | 14 |  | 84 |  |  |  |
| Comparison | 12 | 65/35 | 10 | 87.3 | 2.0 | 2 |

TABLE 7-continued

| MBS | MBS/PVC ratio (part) | Rubber component/ graft component ratio in MBS (weight ratio) | Izod impact strength (Kg · cm/cm) 23° C., V-notch | Transparency Tp (%) H (%) | Degree of* stress whitening (Ball drop) |
|---|---|---|---|---|---|
| Example 7 | 14 | 14 | | | |

Note:
*All Examples and Comparison Examples showed only a slight degree of stress whitening. The lower the degree of stress whitening, the lower is the figure.

We claim:

1. A vinyl chloride resin composition with improved impact resistance and stress-whitening resistance consisting essentially of:
    (A) 60 to 98% of a vinyl chloride resin; and
    (B) 2 to 40% of a graft copolymer, said graft copolymer having been obtained by adding and polymerizing, in one or more stages, 15 to 30 parts of a monomer mixture of an alkyl methacrylate, an aromatic vinyl monomer, and optionally an unsaturated nitrile containing a crosslinking agent in a quantity of 0 to 10% based on the monomer mixture including the crosslinking agent in the presence of a latex comprising 70 to 85 parts of a crosslinked rubber polymer having a degree of swelling of not greater than 7 and a particle size of 600 to 3,000 Å, the sum of the quantities of said monomer mixture and said rubber polymer amounting to 100 parts,
    said latex of the rubber polymer in turn having been obtained through one or more stages of emulsion polymerization of a mixture monomer, said mixture monomer used in each stage comprising not less than 50% of butadiene, 0.2 to 20% of a crosslinking agent and a remainder of an ethylenically unsaturated monomer copolymerizable with butadiene, said rubber polymer thus having a total content of the cross-linking agent of 1.0 to 10%, all stated percentages and parts being by weight.

2. A vinyl chloride resin composition as claimed in claim 1, wherein the graft copolymer has been obtained by polymerizing the monomer mixture in a single stage in the presence of the rubber polymer latex.

3. A vinyl chloride resin composition as claimed in claim 1, wherein the graft copolymer has been obtained by polymerizing the monomer mixture in two stages, the monomer mixture to be polymerized in the second stage comprising a larger quantity of an alkyl methacrylate than the monomer mixture polymerized in the first stage.

4. A vinyl chloride resin composition as claimed in claim 3, wherein the monomer mixture polymerized in the first stage comprises an alkyl methacrylate and an aromatic vinyl monomer, and the monomer mixture polymerized in the second stage comprises an alkyl methacrylate, each of the monomer mixtures comprising 0 to 10% of a crosslinking agent and optionally an unsaturated nitrile.

5. A vinyl chloride resin composition as claimed in claim 1, wherein the monomer mixture grafted onto the crosslinked rubber polymer in entirety comprises 10 to 90% of an aromatic vinyl monomer, 90 to 10% of an alkyl methacrylate, 0 to 50% of an unsaturated nitrile and 0 to 10% of a crosslinking agent.

6. A vinyl chloride resin composition as claimed in claim 1, wherein the average particle size of the crosslinked rubber polymer is 1,500 to 3,000 Å.

7. A vinyl chloride resin composition as claimed in claim 1, wherein the crosslinked rubber polymer has been obtained by multi-stage seed polymerization which comprises polymerizing an additional quantity of a mixture monomer in the presence of a rubber polymer obtained by polymerizing part of the mixture monomer.

8. A vinyl chloride resin composition as claimed in claim 7, wherein the crosslinked rubber polymer has been obtained by two-stage seed polymerization.

9. A vinyl chloride resin composition as claimed in claim 1, wherein the graft copolymer has been obtained by polymerizing 27.5 to 15 parts of the monomer mixture in the presence of 72.5 to 85 parts of the crosslinked rubber polymer.

10. A method of improving a polyvinyl chloride resin in its impact resistance and stress-whitening resistance in combination, which method consists essentially of blending (A) 60 to 98% of a vinyl chloride resin with (B) 2 to 40% of a graft copolymer, said graft copolymer having been obtained by adding and polymerizing, in one or more stages, 15 to 30 parts of a monomer mixture of an alkyl methacrylate, an aromatic vinyl monomer, and optionally an unsaturated nitrile containing a crosslinking agent in a quantity of 0 to 10% based on the monomer mixture including the crosslinking agent in the presence of a latex comprising 70 to 85 parts of a crosslinked rubber polymer having a degree of swelling of not greater than 7 and a particle size of 600 to 3,000 Å, the sum of the quantities of said monomer mixture and said rubber polymer amounting to 100 parts,
    said latex of the rubber polymer in turn having been obtained through one or more stages of emulsion polymerization of a mixture monomer, said mixture monomer used in each stage comprising not less than 50% of butadiene, 0.2 to 20% of a crosslinking agent and a remainder of an ethylenically unsaturated monomer copolymerizable with butadiene, said rubber polymer thus having a total content of the crosslinking agent of 1.0 to 10%, all stated percentages and parts being by weight.

11. A method as claimed in claim 10, wherein the graft copolymer has been obtained by polymerizing the monomer mixture in a single stage in the presence of the rubber polymer latex.

12. A method as claimed in claim 10, wherein the graft copolymer has been obtained by polymerizing the monomer mixture in two stages, the monomer mixture to be polymerized in the second stage comprising a larger quantity of an alkyl methacrylate than the monomer mixture polymerized in the first stage.

13. A method as claimed in claim 12, wherein the monomer mixture polymerized in the first stage comprises an alkyl methacrylate and an aromatic vinyl monomer, and the monomer mixture polymerized in the second stage comprises an alkyl methacrylate, each of the monomer mixtures comprising 0 to 10% of a crosslinking agent and optionally an unsaturated nitrile.

14. A method as claimed in claim 10, wherein the monomer mixture grafted onto the crosslinked rubber polymer in entirety comprises 10 to 90% of an aromatic vinyl monomer, 90 to 10% of an alkyl methacrylate, 0 to 50% of an unsaturated nitrile and 0 to 10% of a crosslinking agent.

15. A method as claimed in claim 10, wherein the average particle size of the crosslinked rubber polymer is 1,500 to 3,000 Å.

16. A method as claimed in claim 10, wherein the crosslinked rubber polymer has been obtained by multi-stage seed polymerization which comprises polymerizing an additional quantity of a mixture monomer in the presence of a rubber polymer obtained by polymerizing part of the mixture monomer.

17. A method as claimed in claim 16, wherein the crosslinked rubber polymer has been obtained by two-stage seed polymerization.

18. A method as claimed in claim 10, wherein the graft copolymer has been obtained by polymerizing 27.5 to 15 parts of the monomer mixture in the presence of 72.5 to 85 parts of the crosslinked rubber polymer.

* * * * *